US005086726A

United States Patent [19]

Sharp

[11] Patent Number: 5,086,726

[45] Date of Patent: Feb. 11, 1992

[54] WHISTLE

[75] Inventor: Michael C. Sharp, Solihull, England

[73] Assignee: J. Hudson & Co. (Whistles) Ltd., England

[21] Appl. No.: 571,927

[22] Filed: Aug. 24, 1990

[51] Int. Cl.[5] .............. G01K 5/00

[52] U.S. Cl. .............. 116/137 R; 116/141; 446/204

[58] Field of Search .............. 116/137 R, 141; 446/204-206; 84/330, 377, 378

[56] References Cited

U.S. PATENT DOCUMENTS

| | | | |
|---|---|---|---|
| 2,529,661 | 11/1950 | Millstein | 84/330 |
| 2,619,865 | 12/1952 | Lynch | 84/330 |
| 4,207,703 | 6/1980 | Saso | 446/205 |
| 4,709,651 | 12/1987 | Lance | 116/137 R |
| 4,821,670 | 4/1989 | Foxcroft et al. | 116/137 R |

FOREIGN PATENT DOCUMENTS

| | | | |
|---|---|---|---|
| 0166416 | 3/1959 | Sweden | 84/330 |
| 0322753 | 12/1929 | United Kingdom | 84/378 |

*Primary Examiner*—Allan N. Shoap
*Assistant Examiner*—W. Morris Worth
*Attorney, Agent, or Firm*—Cushman, Darby & Cushman

[57] ABSTRACT

A referees sports whistle of mandolin shape is provided which has three rectangular whistle chamber elements of the same order of length contained within the mandolin shape of the whistle and arranged side-by-side in a common plane. An exhaust port is provided on the top surface of the whistle to exhaust air, blown into the whistle chamber elements, entirely through the top of the whistle. The whistle is manufactured from two separately moulded parts comprising a first top cover portion including the exhaust port and a second part comprising a main body part including a bulbous portion to be gripped at the sides thereof by the user.

15 Claims, 3 Drawing Sheets

WHISTLE

FIELD OF INVENTION

This invention relates to a pealess whistle more particularly but not exclusively for use by sports referees.

BACKGROUND OF THE INVENTION

Although whistles have been in existence for quite some time there tend to be disadvantages associated with various designs and it is believed that there is an ever increasing need for high quality whistles which can be produced relatively cheaply, the main usage of these whistles being by referees. Such whistles will usually be of a well known shape which may be referred to as a flat-topped "mandolin" shape in side elevation. A well known disadvantage associated with some types of pea whistles is that loss of sound can occur by "overblowing" or by sticking of the freely moving pea in the whistle. Thus, attempts have been made to generally reproduce the loud piercing sound required without incurring the disadvantages of such pea-type whistles.

Even so, it is the Applicant's belief that their own pea-type whistles in particular do not suffer from this disadvantage but, partly in view of the unfavourable reputation of whistles which do tend to have this disadvantage, the fashion and popular trend for whistles seems to be currently favouring pea-less whistles.

Additionally a pealess whistle may also have the advantage that a higher frequency can be generated than can generally be achieved with a pea-type whistle. Since higher frequency sounds are more easily distinguished from background noise, referees in particular generally prefer a whistle yielding as high a pitched sound as possible. Additionally, pealess whistles generally avoid the need for expensive assembly and test procedures that are required with pea-type whistles.

One design of pealess whistle is shown in U.S. Pat. Specification No. 4,821,670 (Foxcroft et al) but it is believed that this proposed whistle design still tends to have certain disadvantages, some of which are detailed as follows:

1. Air blown into the whistle shown in 4,821,670 exhausts through the top and side surfaces and, as such, there is a possibility that the sound chambers may become blocked by fingers gripping onto the sides of the whistle overlapping the side exhaust vents. Indeed, other pealess whistles have been designed which exhaust through the side of the whistle and even also underneath the whistle directing the sound directly into the hand of the user, thereby reducing the maximum sound the whistle could otherwise be designed to release. In practice, it is believed that the provision of side venting of the exhaust air tends to provide a significant disadvantage.
2. The whistle shown in 4,821,670 has a central whistle chamber element of greater length than two other whistle chamber elements provided on either side of the central whistle chamber element and, in order to cater for the extra long central whistle chamber element required, an extension or boss is needed which juts out from the general "mandolin" shape in a manner which it is believed detracts from the overall appearance of the whistle and is generally inconvenient overall in the manufacturing process and may well unnecessarily increase the costs of production.
3. It is believed that the form and disposition of the whistle elements shown in 4,821,670 are unnecessarily complex, such complexity apparently being believed necessary in order to produce complex harmonics and beats that increase the piercing quality and audibility of the sound.
4. The whistle is made as a three-part moulding and the Applicant believes that the moulding process can be made much simpler.
5. Owing to the size and disposition of the whistle chamber elements it is believed that the overall shape of the whistle is more bulky than need be the case in order to achieve the same or a similar quality of sound considered sufficient for the intended use.

SUMMARY OF INVENTION

It is an object of the present invention to provide a whistle which at least alleviates one or more of the aforementioned, or indeed other, disadvantages associated with pealess whistles.

It is a further object of the present invention to provide a simplified and possibly cheaper method of whistle construction.

According to the present invention there is provided a pealess whistle generally of "mandolin" shape as herein defined, said whistle comprising at least three whistle chamber elements extending side by side in a common plane and exhaust port means being provided on the top of the whistle to allow air blown into the whistle to be exhausted from said whistle chamber elements through said port means.

The term "mandolin" shape is herein defined as meaning the shape of whistle which in some sense resembles the shape of a mandolin, in which the mouthpiece of the whistle resembles the narrow elongate neck of the mandolin with a somewhat bulbous (normally part circular or curved) rear portion accommodating at least three whistle chamber elements, the bulbous rear portion extending downwardly to form a shaped base which is, in practice, gripped by the user of the instrument on the sides thereof.

Most preferably, air can be exhausted from the whistle chamber elements only through said port means so that air is exhausted entirely through the upper surface of the whistle. This enables the whistle to be gripped by the sides of the bulbous portion without any risk of exhaust port means being blocked thereby, which as explained previously could hamper the required sound production of the whistle.

Preferably, all of the whistle chamber elements are accommodated within the overall "mandolin" shape with none of the chambers extending outwardly beyond said bulbous portion or being contained e.g. in an unsightly projection extending beyond said bulbous portion. Advantageously, said at least three whistle chamber elements are of the same order of length (although different) and may be generally square or rectangular (rather than part-circular or part-elliptical) in cross section. The whistle chamber element may be of identical or similar cross section to one another.

Providing the whistle chamber elements in side by side relationship in a common plane enables the overall design of the whistle to be less complicated than would otherwise be the case and considerably simplifies the moulding process involved. Advantageously, the whistle may consist of just two moulded parts whereas other pealess whistles of a similar type are normally manufactured in a minimum of three parts.

Where the whistle is moulded in two parts as aforementioned, preferably, the first part comprises a top cover portion containing said exhaust port means and the second portion comprises a main body part of the whistle including said bulbous portion and at least part of said whistle chamber elements. Preferably, the first and second parts fit together to form the mouthpiece and to close off or complete the whistle chamber elements within the whistle.

The whistle may be provided with a loop for attachment of a lanyard or chain or the like to retain the whistle about the user's neck and where the whistle is made in two parts as aforesaid, part of the loop may be present on the first top cover portion and the other part of the loop being on the lower, second portion assembly of said cover and second portion completing the loop. Preferably, said two parts of the whistle are welded to one another and will usually be of ABS plastics.

BRIEF DESCRIPTION OF THE DRAWINGS

Two embodiments of pealess whistles in accordance with the present invention will now be described, by way of example only, with reference to the accompanying drawings in which.

DESCRIPTION OF PREFERRED EMBODIMENTS

Figure 1:
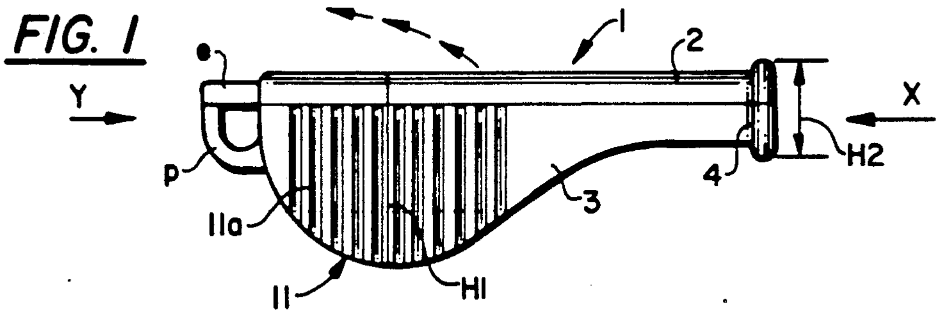
FIG. 1 shows the first embodiment of the pealess whistle in side elevation.
Figure 2:
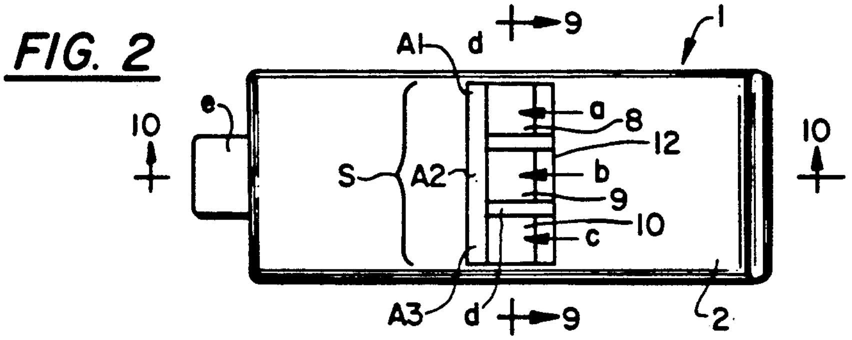
FIG. 2 shows a top view of the whistle shown in FIG. 1.
Figure 3:
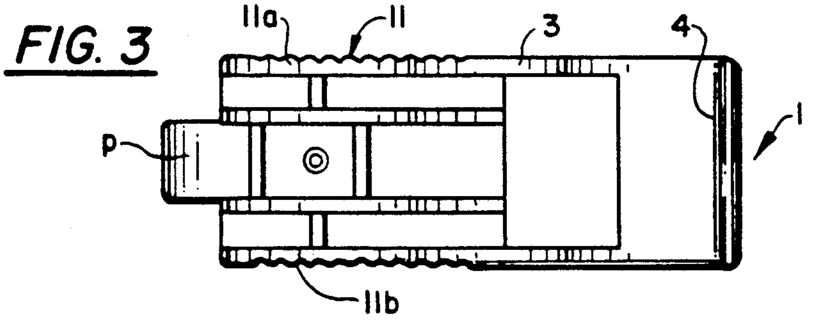
FIG. 3 shows an inverted plan view of the whistle shown in FIG. 1.
Figure 4:
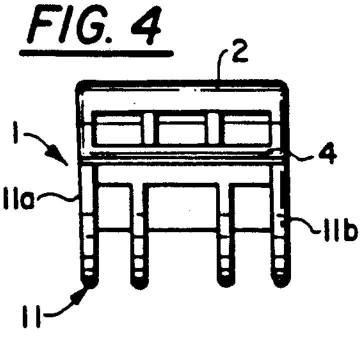
FIG. 4 shows an end view of the whistle looking in the direction of arrow X in FIG. 1.
Figure 5:
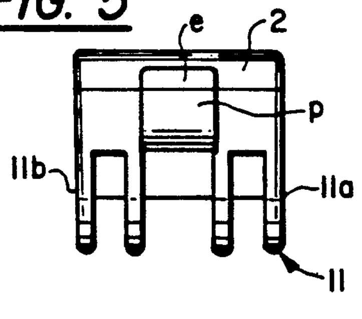
FIG. 5 shows an end view of the whistle looking in the direction of arrow Y on FIG. 1.
Figure 6:
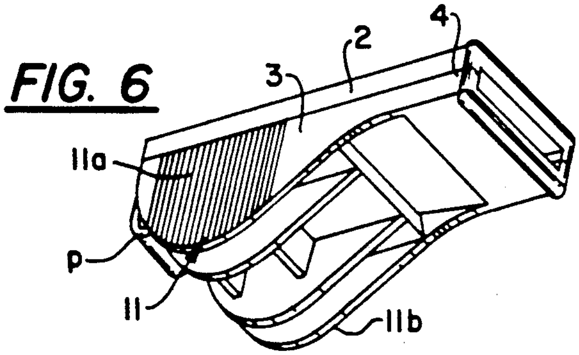
FIG. 6 shows a perspective view of the whistle.

FIGS. 1 to 10, and 10*a* show views of a first embodiment of a pealess whistle 1 which is generally of "mandolin" shape as herein defined. The whistle is made from ABS plastics and as should be apparent from FIGS. 1 to 10,10*a* consists of two moulded parts namely an upper top cover part 2 and a lower part 3. Parts 2 and 3 are separately moulded and welded together to form the whistle. Whistle 1 has a mouthpiece 4 which leads to three whistle chamber elements 5,6 and 7 arranged in side-by-side relationship in a common plane as should be clearly evident from the FIGURES. The top of the whistle 1 is provided with exhaust port means in the form of three exhaust ports 8,9,10 (provided more specifically on the top cover portion 2) so that air blown into the whistle through the mouthpiece 4 travels into the respective whistle chamber elements 5,6,7 in the direction of arrows a,b,c (see FIG. 2), along the length of the whistle elements and back again to exhaust from the whistle through the ports 8,9,10. Thus, advantageously, the sound produced is projected away from the user entirely through the top of the whistle. In use, the whistle 1 is gripped by the fingers of a user's hand engaging the flat sides 11*a* and 11*b* of the curved bulbous part 11 of the whistle without blocking or obstructing the port means, because if the air from the whistle chamber elements were arranged to exhaust through sides 11*a* and 11*b* there would be a risk of the chambers becoming blocked (or obstructed) by the fingers of the hand which could adversely affect the sound being produced. Each port 8,9,10 is provided with a rearwardly and upwardly inclined surface A1,A2,A3 so that the air is exhausted from the chambers, advantageously, over the top of the whistle and away from the user generally towards the rear of the whistle. The inclined surfaces A1,A2,A3 form an integral inclined surface S which assists in creating the desired air flow away from the user. The front edges of the ports 8,9,10 join to form a common surface 12 which is arranged transversely at right angles to the axis of the whistle.

Advantageously, the whistle chamber elements 5,6, and 7, although of different length, are generally of the same order of length (see FIG. 7) and there is no necessity to form a rearward extension boss on the bulbous part 11 of the whistle 1 in order to accommodate an extra long whistle chamber element as has been the case in the past. Since the whistle chamber elements 5,6 and 7 are all located in a common plane the height of the whistle H1 in cross section and in particular the height H2 of the mouthpiece (see FIG. 1) can be slimmer than would otherwise be the case if a height differential between the whistle element chambers were to be required, as has been the case with previous designs. Positioning the whistle element chambers 5,6,7 as shown in the FIGURES allows a greater versatility in the overall design of the whistle shape and gives less constraints on the designer. Additionally, and most advantageously, the whistle design allows it to be manufactured in only two parts (namely upper part 2 and lower part 3) in a manner which is to be described later on in the specification.

It is also believed that the design and disposition of the whistle chamber elements 5,6,7, in particular detail, has very significant advantages over other designs. Firstly, it has been found that the rectangular or cross-sectional shape of the whistle elements 8,9 and 10 offers a much improved sound quality over and above circular or elliptical (or part circular or part elliptical) whistle elements. The particular internal dimensions of the whistle chambers and the relative dimensions of said chambers, cutting edge angles and sound chamber divider means d enable three side-by-side parallel whistle chamber elements 5,6,7 to be provided running along the top of the whistle, within the whistle itself (without an extension boss being required to accommodate an extra long whistle chamber element) in a most convenient manner which also produces a good sound quality. Forming the three whistle chamber elements 5,6,7 with the divider means d in the form of straight (relatively thin) partition walling greatly facilitates the moulding process and, indeed, enables the whistle to be produced from only two separately moulded parts.

Figure 7:
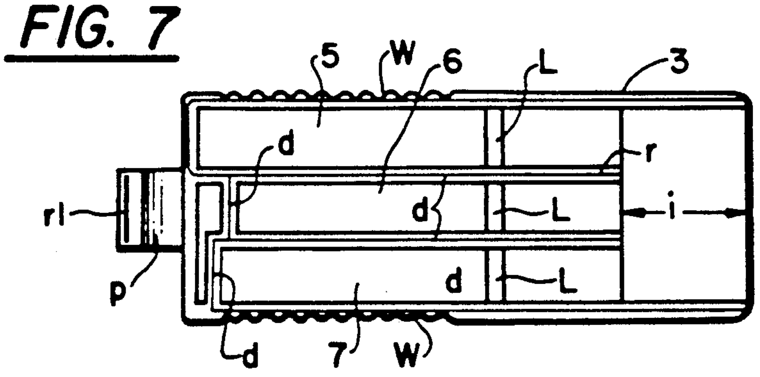
FIG. 7 shows a plan view corresponding to FIG. 2 with a top cover portion of the whistle removed.
Figure 8:
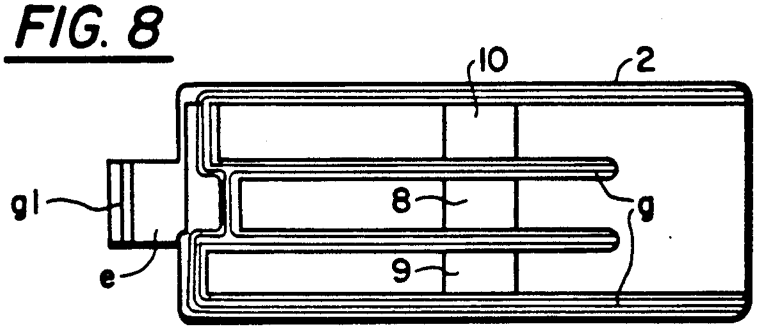
FIG. 8 shows an inverted plan view of said cover portion.
Figure 10:
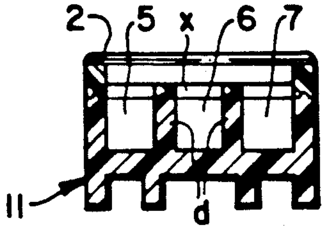
FIG. 10 shows a transverse sectional view of the whistle taken on line IX—IX of FIG. 2.
Figure 10A:
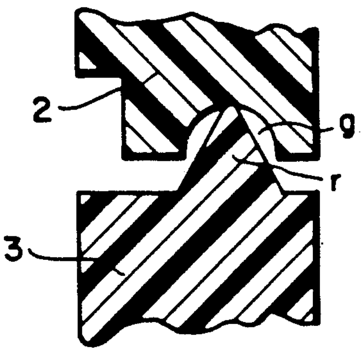
FIG. 10*a* shows a fragmentary detail of the engagement between the top cover portion and the remainder of the whistle before welding.
Figure 11:
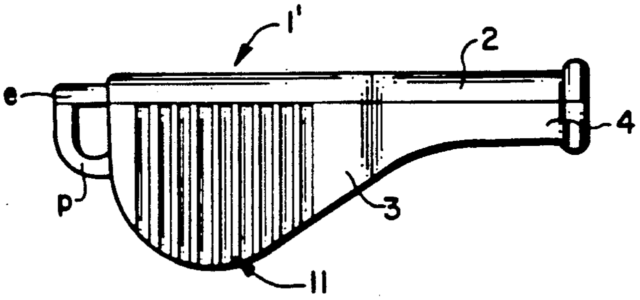
FIGS. 11 to 16 show views of the second embodiment of the whistle which correspond generally with FIGS. 1 to 6.
Figure 12:
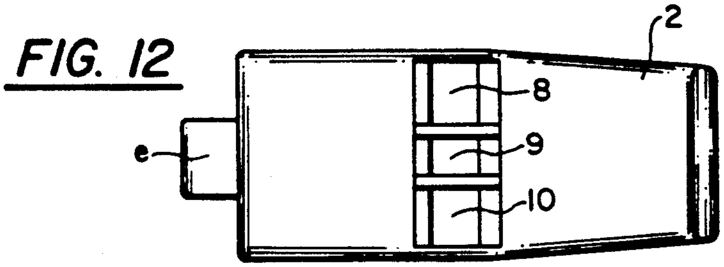
Figure 13:
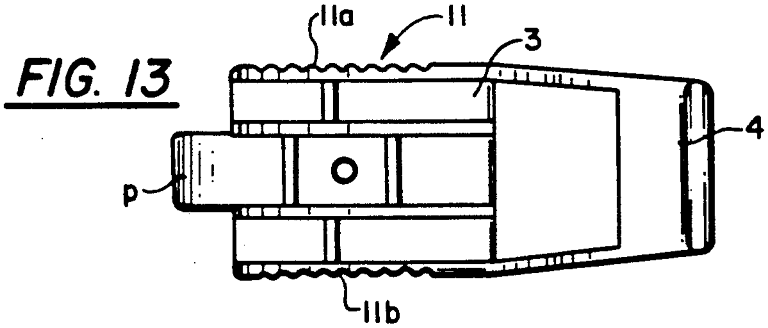
Figure 14:
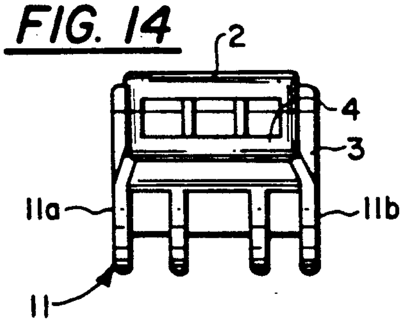
Figure 15:
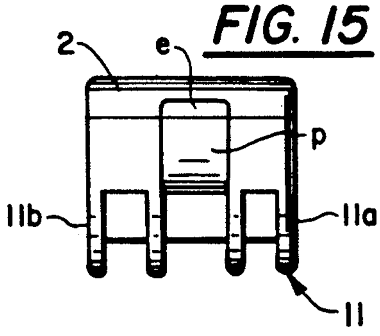
Figure 16:
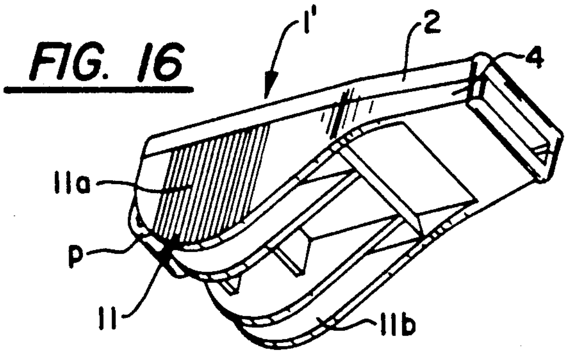

As will be evident more particularly from FIGS. 7 and 8 the divider means d is provided with an upper integral rib r (see FIG. 10) which also runs along the side walls w of the whistle as far as the end of mouthpiece 4 and this engages with a groove g formed on the underside of the top cover portion 2 (see FIG. 8). During assembly of the top cover part 2 to the lower part 3 the rib r is welded into the groove g such that parts 2 and 3 are sealed together. FIG. 10*a* shows the disposition of the rib r in the groove g prior to welding. Additionally, lower part 3 is provided with an upwardly curved projection p provided with an upper rib r1 which is welded into a groove g1 on rearwardly extending projection e of the top cover part 2, as parts 2 and 3 are welded together. Curved projection p and extension part e together define a loop through which a lanyard or chain may be passed in order to secure the whistle to the user's neck or otherwise.

Figure 9:
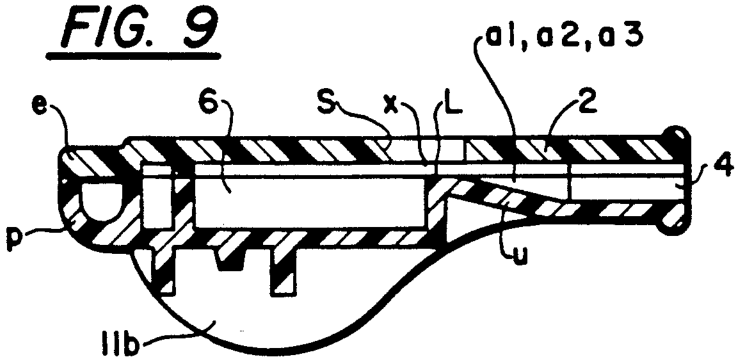
FIG. 9 shows a longitudinal sectional view of the whistle taken on line X—X of FIG. 2.

The inner bottom portion of the mouthpiece 4 extends horizontally for a distance i from the extreme end thereof and is then inclined upwardly at U to horizontal ledge portions L. The divider means d extend along the whistle to within distance i from the end of the mouthpiece. Thus, air blown into the whistle 1 travels along the axis of the whistle, across the bottom portion of the mouthpiece, for a distance i and is then entrained into three tapered compartments a1,a2,a3 each having an upwardly inclined floor portion at U before passing over the ledge portions L into the respective whistle chamber elements 5,6 and 7. The angle of inclination of the floor of each of the tapered compartments is a common angle of about 25 to 30 degrees to the horizontal (see FIG. 9) and the height or depth dimension of each of the whistle chambers is slightly greater than the internal depth or height dimension of the mouthpiece. The lengths of the whistle chamber elements 5,6 and 7 are all approximately the length of the bulbous part of the whittle and the depth or distance x of the ledge portions L from the underside of the cover part 2 is relatively small, for example 1 mm or so so that the air entering the whistle chamber elements 5,6,7 is effectively via a narrow slit of depth x; FIG. 9 shows that the ledge portions L are spaced slightly rearwardly of vertical surface 12.

FIGS. 11 to 16 show a second embodiment of the whistle 1' which is substantially similar in form to the first embodiment of the whistle already described except that the mouthpiece is now tapered as shown.

It is believed that the precise configuration and relative dimensions, and thin partition walling (divider means) between the whistle chamber elements is extremely advantageous in producing high quality sound while allowing a simplified moulding process to be used.

It is to be appreciated that the present invention offers many improvements at least some of which might be patentable individually or in combination. Any individual feature as aforementioned or as shown or implicit herein or combinations thereof or functions or methods appertaining thereto, may be patentably inventive and any specific term as used herein should not be construed as unnecessarily or unduly limiting; the scope of such a term should extend to, or may be replaced or supplemented by, any reasonable equivalent or generic expression. In this connection, the whistle as hereinbefore described offers many significant advantages including the rectangular whistle chamber elements which might be patentable in themselves as well as the structural features of the whistle which provide the particular advantageous air flow as will be apparent from the FIGURES of the drawings.

Therefore, further according to the present invention there is provided a whistle having one or more of the following features:

(a) Rectangular or partially rectangular or square or partially square, whistle chamber elements, (b) whistle chamber elements formed by dividing partition walls, preferably extending into the mouthpiece of the whistle, (c) a generally mandolin shape with air being exhausted from the whistle entirely through the top of the whistle, (d) at least three whistle chamber elements of similar but not identical length being formed entirely within a mandolin shape of the whistle, (e) the whistle being comprised entirely of two separately moulded parts preferably comprising a lower portion and an upper top cover portion, (f) the whistle being a mandolin shaped whistle with at least three whistle chamber elements extending in a common plane, (g) a mouthpiece with a flat floor portion leading to a tapered floor portion in which upwardly tapering compartments are defined leading to whistle chamber elements, ledge means preferably being provided at a rear end of the tapering compartments, said ledge means preferably being rearward of, and open to, exhaust port means for venting air blown into the mouthpiece from said whistle chamber elements.

(h) grip means in the form of ribbing being provided on the sides of the whistle, (i) the internal depth (height) of whistle chamber elements, being slightly greater than the internal depth (height) of a mouthpiece of the whistle, (j) rearwardly and upwardly tapered whistle components in the mouthpiece leading to elongate whistle chamber elements, and preferably, upper ledge portions being provided at the rear of the tapered compartments aranged rearwardly of and below the level of port means for exhausting air from the whistle chamber elements.

What we claim is:

1. A pealess whistle comprising:

a neck portion having a longitudinal axis and first and second longitudinal ends, said neck portion having a first part extending from said second longitudinal end along at least a portion of the length of said neck portion;

a mouthpiece defined at said first longitudinal end of said neck portion;

at least one curved depending wall, said wall extending from said first part of said neck portion on one side of said longitudinal axis of said neck portion;

at least three whistle chamber elements extending side by side in a common plane along at least a portion of the length of said neck portion from a mouthpiece opening of each said chamber element adjacent said first longitudinal end of said neck portion toward said second longitudinal end; and exhaust port means defined through a surface of said neck portion between said first and second longitudinal ends and on a second side of said longitudinal axis of said neck portion opposite to said one side, for exhausting air blown into the mouthpiece, whereby said neck portion and said said at least one wall together define a generally mandolin shape.

2. A whistle as in claim 1, wherein said exhaust port means is the sole means for exhausting air from said whistle chamber elements while air is blown into the mouthpiece whereby air passing into said whistle chamber elements through said mouthpiece openings is exhausted entirely through said second side of said whistle.

3. A whistle as claimed in claim 1, wherein said at least three whistle chamber elements have a length in the same order of magnitude and have a substantially rectilinear cross-section.

4. A whistle as claimed in claim 1, wherein the whistle chamber elements have a substantially similar cross-section to one another.

5. A whistle as claimed in claim 3, wherein the whistle chamber elements have a substantially square cross-section.

6. A whistle as claimed in claim 1, wherein said whistle consists of first and second molded parts welded to one another.

7. A whistle as claimed in claim 6, wherein one of said two molded parts comprises a top cover portion having said exhaust port means defined therethrough and a second of said molded parts comprises a main body part including said at least one wall and defines at least a portion of said whistle chamber elements.

8. A whistle as in claim 1, further comprising attachment means at said second longitudinal end of said neck portion for mounting said whistle to a lanyard or chain.

9. A whistle as claimed in claim 1, wherein said neck portion and said at least one wall are formed from a plastic material.

10. A whistle as in claim 1, wherein said whistle chamber elements are defined by partition walls extending longitudinally of said neck portion and at least partially into the mouthpiece defined at said first longitudinal end thereby to define said mouthpiece openings.

11. A whistle as in claim 1, further comprising ribbed grip means defined on said at least one wall.

12. A whistle as in claim 1, wherein said neck portion has a flat floor portion leading to a tapered floor portion and ledge means defined at an end of said tapered floor partion, said ledge means being defined adjacent said exhaust port means so that air flowing towards the mouthpiece from said whistle chamber elements is vented through said exhaust port means.

13. A whistle as in claim 12, wherein said ledge means are defined below said exhaust port means.

14. A whistle as in claim 1, wherein an internal cross-sectional depth of said whistle chamber elements is slightly greater than an internal cross-sectional depth of said mouthpiece.

15. A whistle as in claim 1, wherein said whistle chamber elements are defined by a large chamber which is divided into at least three chambers by partition walling, said large chamber being rectangular in cross-section and of constant cross-sectional depth.

* * * * *